US012526259B2

(12) United States Patent
Tunney et al.

(10) Patent No.: US 12,526,259 B2
(45) Date of Patent: Jan. 13, 2026

(54) PRIVATE AND SECURE DATA PORTAL

(71) Applicant: Mind Foundry Ltd, Oxford (GB)

(72) Inventors: Patrick Tunney, Salisbury (GB); Nathaniel Korda, Oxford (GB); Brian Mullins, Oxford (GB); Michael Osborne, Oxford (GB); Stephen Roberts, Shipton-on-Cherwell (GB); Davide Zilli, Oxford (GB); Alistair Garfoot, Oxford (GB)

(73) Assignee: Mind Foundry Ltd, Oxford (GB)

( * ) Notice: Subject to any disclaimer, the term of this patent is extended or adjusted under 35 U.S.C. 154(b) by 50 days.

(21) Appl. No.: 18/497,339

(22) Filed: Oct. 30, 2023

(65) Prior Publication Data

US 2025/0141850 A1    May 1, 2025

(51) Int. Cl.
*H04L 9/40* (2022.01)
*H04L 9/00* (2022.01)

(52) U.S. Cl.
CPC .......... *H04L 63/0428* (2013.01); *H04L 9/008* (2013.01)

(58) Field of Classification Search
CPC .. H04L 63/0428; H04L 9/008; G06F 21/6245
USPC ........................................................ 713/168
See application file for complete search history.

(56) References Cited

U.S. PATENT DOCUMENTS

| 7,024,558 | B1 * | 4/2006 | Satake | G06F 21/64 |
| | | | | 380/54 |
| 11,783,921 | B2 * | 10/2023 | Peccoud | H04L 9/3247 |
| | | | | 713/176 |
| 12,206,759 | B1 * | 1/2025 | Ivey | H04L 9/0631 |
| 2005/0193194 | A1 * | 9/2005 | Kokubo | H04N 5/913 |
| | | | | 713/160 |
| 2009/0144057 | A1 * | 6/2009 | Cabezas | G10L 13/033 |
| | | | | 704/235 |
| 2015/0350900 | A1 * | 12/2015 | Kruglick | H04L 9/3273 |
| | | | | 713/168 |

(Continued)

OTHER PUBLICATIONS

"International Application Serial No. PCT IB2024 000606, International Search Report mailed Feb. 25, 2025", 4 pgs.

(Continued)

*Primary Examiner* — Amare F Tabor
(74) *Attorney, Agent, or Firm* — Schwegman Lundberg & Woessner, P.A.

(57) ABSTRACT

A system for private and secure data portal is described. A method includes receiving, from a first client device, a permission request and a data request for a first dataset that is stored at a second client device, providing the permission request and the data request to the second client device, the second client device configured to generate, in response to the permission request and the data request, a data usage approval document and an encrypted synthesized dataset corresponding to the data usage approval document, the encrypted synthesized dataset includes a synthetic second dataset representative of the first dataset, receiving, from the second client device, the data usage approval document and the encrypted synthesized dataset, performing, at a server, a computation on the encrypted synthesized dataset based on the data request, and providing the data usage approval document and results of the computation to the first client device.

20 Claims, 11 Drawing Sheets

(56) References Cited

U.S. PATENT DOCUMENTS

2021/0326752 A1\* 10/2021 Kim ........................ H04L 9/008
2022/0198034 A1\* 6/2022 Rodriguez .............. H04L 9/008

OTHER PUBLICATIONS

"International Application Serial No. PCT IB2024 000606, Written Opinion mailed Feb. 25, 2025", 5 pgs.
Sadat, Md Nazmus, "Safety: Secure gwAs in Federated Environment through a hYbrid Solution", IEEE ACM Transactions On Computational Biology and Bioinformatics, IEEE Service Center, New York, NY, US, vol. 16, No. 1, (Jan. 1, 2019), 93-102.

\* cited by examiner

PRIVATE AND SECURE DATA PORTAL

TECHNICAL FIELD

The subject matter disclosed herein generally relates to methods, systems, and programs for a data portal. Specifically, the present disclosure addresses an architecture for providing a private and secure third-party access data portal.

BACKGROUND

Databases contain data can be operated on to extract value. However, these databases are likely to include personal or other sensitive information. Typically, a third-party needs to obtain specific permission to perform any data analysis on the data. Obtaining these permissions often results in a lengthy process between data owners and data analysts. This process significantly slows down any procedure in trying to extract value from the database, and can also prohibit projects from starting at all.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
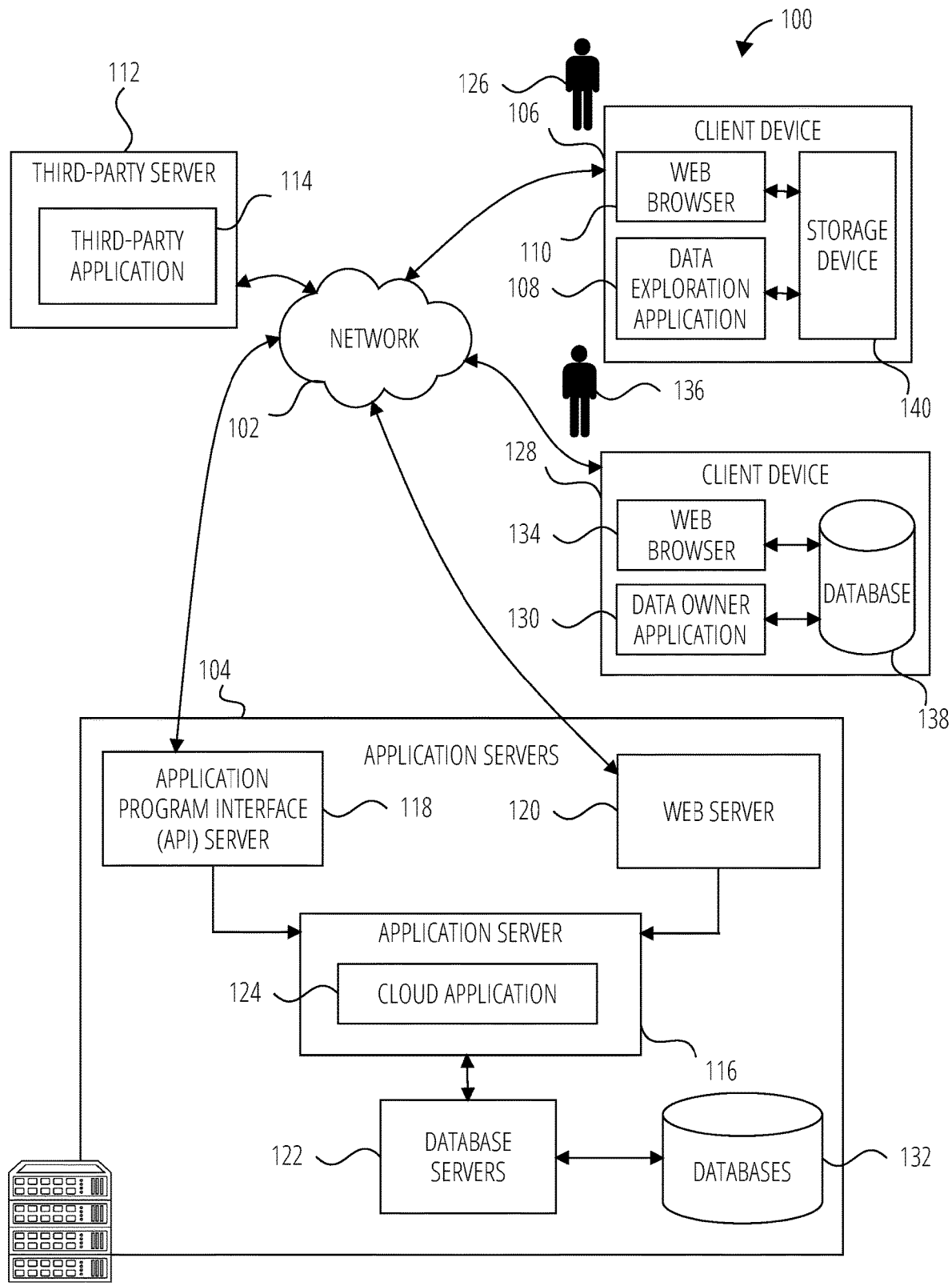
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Companies and organizations accumulate a wealth of information on their customers and store this information in their databases, from which valuable information can be extracted. However, these databases are likely to contain personal or other sensitive information. Specific permissions need to be obtained in order for exploratory data analysis to be performed on the data. Obtaining these permissions often requires a lengthy conversation between data owners (also referred to as data protection officers) and those wishing to make use of the data (also referred to as data scientists), be they internal or external. Example of a document resulting from the negotiation between data owners and data scientists is known a Data Protection Impact Assessment (DPIA). The process of obtaining a DPIA significantly slows down the time-to-value in any process trying to extract value from the databases, and can also prohibit projects from starting at all.

The present application describes a mechanism for enabling private and secure data exploration before formal data-release. Bypassing the lengthy DPIA process allows data owners to confidently, and with little oversight, allow data scientists to conduct exploratory data analysis. Data release, when necessary, is also expedited. The mechanism for enabling such private and secure data exploration combines privacy (e.g., differential privacy) and encryption (e.g., homomorphic encryption) technologies through a cloud-based portal.

The combination of encryption and privacy techniques for algebraic computation offers the possibility of allowing remote third party access to a database containing sensitive data, without the need for complicated and lengthy data permission processes. The privacy techniques provide the facility to explore the content of the dataset without infringing individual privacy rights. The encryption techniques allow for the exploration to be conducted securely at a remote location, and even allow for required computation to be performed remotely in the cloud without introducing a security risk.

A key barrier to data driven innovation within businesses is the requirement to gain formal permission to process any data that has sensitive content. A private and secure data portal removes this barrier, allowing data exploration to occur without the need for a full data release process to take place, and facilitates such a process when sufficient data exploration has taken place to expedite the process.

Data scientists can use the encrypted private data to generate a machine learning model. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data.

The private and secure data portal technology has the potential to enable transformative data exploration across many industries and applications where proprietary databases contain sensitive information, including financial services, healthcare, retail, insurance, government, automotive, social media, smart devices, mobile apps, and research institutions. By facilitating controlled data access for preliminary analysis, the technology can unlock data-driven insights and innovation for personalized services, predictive modeling, system optimization, risk management, policy decisions, autonomous systems, engagement strategies, and sensitive research questions. Any domain that stands to gain from analyzing sensitive datasets could benefit immensely from exploring the full value of their data using this privacy-preserving approach prior to full release or permissions.

In one example embodiment, a system and method for private and secure data portal is described. The method includes receiving, from a first client device, a permission request and a data request for a first dataset that is stored at a second client device, providing the permission request and the data request to the second client device, the second client device configured to generate, in response to the permission request and the data request, a data usage approval document and an encrypted synthesized dataset corresponding to the data usage approval document, the encrypted synthesized dataset includes a synthetic second dataset representative of the first dataset, receiving, from the second client device, the data usage approval document and the encrypted synthesized dataset, performing, at a server, a computation on the encrypted synthesized dataset based on the data request, and providing the data usage approval document and results of the computation to the first client device.

As a result, one or more of the methodologies described herein facilitate solving the technical problem of providing private and secure third-party access to a database for purpose of data exploration activities (e.g., machine learning modeling). As such, one or more of the methodologies described herein may obviate a need for certain efforts or computing resources that otherwise would be involved in a complex process of specific data permission requests and specific data access confirmations between client devices. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to networked user devices, in the form of a client device 106, and a client device 128. The client device 106 includes a web browser 110 (e.g., a browser), a data exploration application 108 (e.g., an "app"), and a storage device 140. A user 126 (e.g., data scientist) operates the client device 106. The client device 128 includes a web browser 134, a data owner application 130, and a database 138. A user 136 (e.g., data owner) operates the client device 128.

An Application Program Interface (API) server 118 and a web server 120 provide respective programmatic and web interfaces to application servers 104. A specific application server 116 hosts a cloud application 124 (which includes components, modules and/or applications). The client device 106 sends a data request to the cloud application 124. The client device 128 sends an encrypted synthesized data to the cloud application 124. The cloud application 124 performs a computation on the encrypted synthesized data, and provides results of the computation to the client device 106. In one example, the cloud application 124 generates a machine learning model based on the encrypted synthesized data. In another example, the data owner application 130 performs a combination of differential privacy algorithm and homomorphic encryption algorithm on the original data from database 138 to generate the encrypted synthesized data. As such, the encrypted synthesized data includes a version of the original data that is stripped of confidential or sensitive data and yet retains algebraic properties using homomorphic encryption.

In some example embodiments, the cloud application 124 includes machine-learning programs (MLPs), also referred to as machine-learning algorithms or tools, that are utilized to perform operations associated with predicting a value of an item at a future point in time, solving values of a target column, or discovering features of training data.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a machine learning model from training data in order to make data-driven predictions or decisions expressed as outputs. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying attributes of the training data or identifying patterns in the training data.

The web browser 110 communicates with the cloud application 124 via the web interface supported by the web server 120. Similarly, the data exploration application 108 communicates with the cloud application 124 via the programmatic interface provided by the Application Program Interface (API) server 118 (e.g., a cloud-based private and secure data portal API). In one example, the data exploration application 108 provides a graphical user interface (GUI) for requesting and exploring data sets from database 138. The data exploration application 108 can decrypt encrypted responses to data queries, export data usage permission documents and synthesized data.

The web browser 134 communicates with the cloud application 124 via the web interface supported by the web server 120. Similarly, the data owner application 130 communicates with the cloud application 124 via the programmatic interface provided by the Application Program Interface (API) server 118 (a cloud-based private and secure data portal API). In one example, the data owner application 130 provides a GUI for setting up automatic requests from the database 138. The data owner application 130 generates private and synthesized versions of dataset from the database 138. The data owner application 130 further encrypts the data in a way that still allows for algebraic manipulation.

The data exploration application 108 of the client device 106 generates a request to view or manipulate data via the Application Program Interface (API) server 118. The data owner application 130 of the client device 128 provides the encrypted synthesized data to the application servers 104 via the Application Program Interface (API) server 118.

In one example, the cloud application 124 performs algebraic computation on the encrypted synthesized dataset provided by the data owner application 130. The cloud application 124 may store the results of the algebraic computation in a cache.

The application server 116 is shown to be communicatively coupled to database servers 122 that facilitates access to an information storage repository or databases 132. In an example embodiment, the databases 132 includes storage devices that store information (e.g., dataset, approval documents, machine learning model library) to be processed by the cloud application 124.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may support one or more features or functions on a website hosted by the third party. For example, the third-party application 114 provides training data marketplace to the cloud application 124. In another example, the third-party application 114 performs computations on the encrypted synthesized data on behalf of the cloud application 124.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106, client device 128 may be embodied within the network environment 100. Furthermore, some components or functions of the network environment 100 may be combined or located elsewhere in the network environment 100. For example, some of the functions of the client device 106, client device 128 may be embodied at the application server 116 (or at the third-party server 112).

Figure 2:
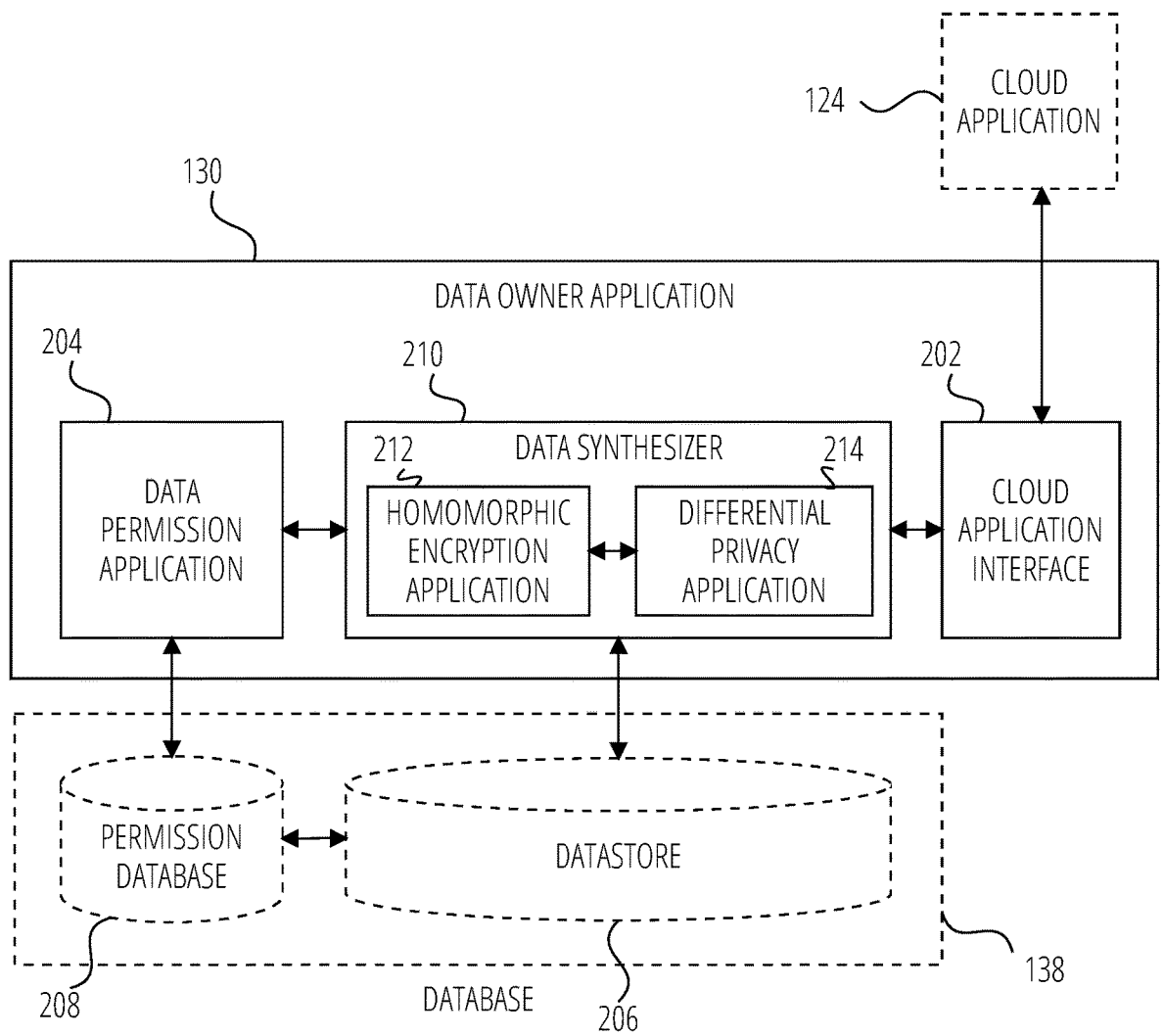
FIG. 2 is a block diagram illustrating a data owner application in accordance with one example embodiment.

FIG. 2 illustrates a data owner application 130 and a database 138 in accordance with one example embodiment. The data owner application 130 includes a data permission application 204, a data synthesizer 210, and a cloud application interface 202. The database 138 includes a permission database 208 and a datastore 206.

The cloud application interface 202 communicates with the cloud application 124. In one example, the cloud application interface 202 receives a data request and a permission request from client device 106 (e.g., data scientist) to access data stored in the datastore 206 of the database 138. The data request includes, for example, a request to view a summary of the data, to view the full original data, to view a synthesized version of the original data, to perform a computation on the encrypted synthesized data.

The data synthesizer 210 generates the encrypted synthesized data by applying a combination of a homomorphic encryption algorithm and a differential privacy algorithm. The data synthesizer 210 includes a homomorphic encryption application 212 and a differential privacy application 214.

Those of ordinary skills in the art will recognize that homomorphic encryption algorithm is a type of encryption for which it is possible to perform algebraic manipulations of encrypted data without decrypting them. The data exploration application 108 can decrypt the outcome of the algebraic manipulation. Many data exploration activities can be performed through a series of algebraic manipulations. Examples of algebraic manipulations include:
  computation of statistical summaries such as histograms correlation analyses or averaging; and
  fitting and predicting of statistical models, such as machine learning models.

As encrypted computation can be resource intensive, the computation can be performed at the cloud application 124 on the application servers 104 (rather than on local machines).

Those of ordinary skills in the art will recognize that differential privacy algorithm offer a tunable guarantee degree of privacy to individuals. The greater the guarantee achieved, the more the information in the underlying data is obscured. Differential privacy is an example of preserving private data, and can be potentially applied to any data query. Examples differentially private algorithms include:
  computation of statistical summaries such as histograms correlation analyses or averaging; and
  fitting and predicting of statistical models, such as machine learning models.

Additionally, it is possible to create differentially private synthesized versions of data sets which do not contain any of the original data.

The homomorphic encryption application 212 applies the homomorphic encryption algorithm to the requested set of data or data from the datastore 206. The differential privacy application 214 applies the differential privacy algorithm to the same set of data. The encrypted synthesized data is based on both the output of the homomorphic encryption application 212 and the output of the differential privacy application 214.

In another example embodiment, the homomorphic encryption application 212 applies the homomorphic encryption algorithm to the requested set of data or data from the datastore 206. The differential privacy application 214 applies the differential privacy algorithm to the results of the homomorphic encryption application 212. The encrypted synthesized data includes the results of the output of the homomorphic encryption application 212.

In another example embodiment, the differential privacy application 214 applies the differential privacy algorithm to the requested set of data or data from the datastore 206. The homomorphic encryption application 212 applies the homomorphic algorithm to the results of the differential privacy application 214. The encrypted synthesized data includes the results of the output of the differential privacy application 214.

The data permission application 204 includes a set of configurable permission settings and rules defined by the user 136 of the client device 128. For example, the data permission application 204 may map different types of permissions based on the data requested, the permission request, the client device 106, and the user 126. For example, the data permission application 204 maps a full data access rights permission to a specific user (e.g., user 126). In another example, the data permission application 204 maps a limited data access right permission to another specific user. In another example, the data permission application 204 maps a summarized data access rights permission to another specific user or to a data request that includes a data summary request. In another example, the data permission application 204 maps an encrypted synthesized data access rights permission to a data request for a synthesized version of the original data. In another example, the data permission application 204 maps an encrypted synthesized data access rights permission to a data request for a computation or modeling of the original data. The data permission rights permission are stored in the permission database 208.

Figure 3:
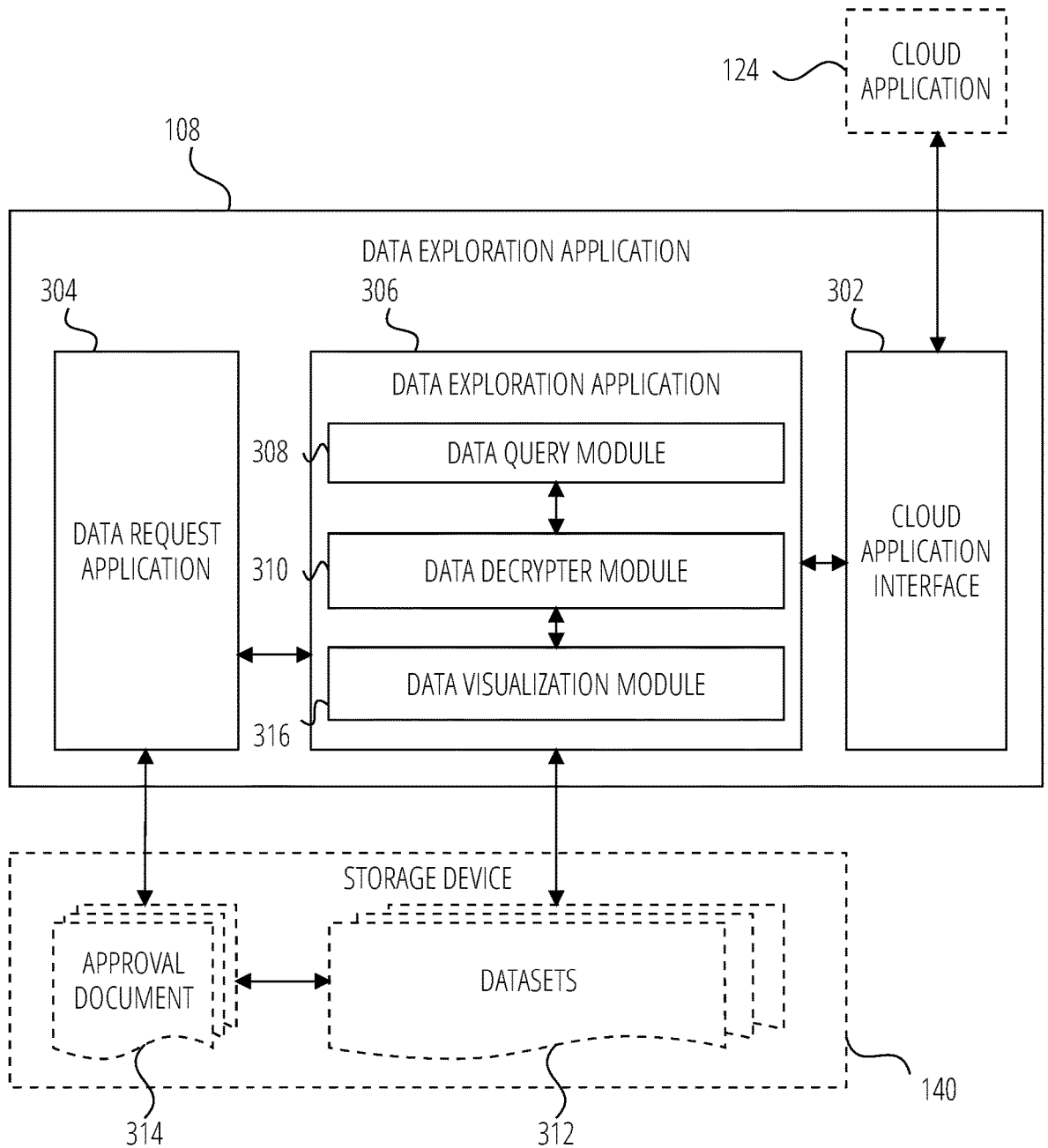
FIG. 3 is a block diagram illustrating a data exploration application in accordance with one example embodiment.

FIG. 3 illustrates a data exploration application 108 in accordance with one example embodiment. The data exploration application 108 includes a data request application 304, data exploration application 306, and cloud application interface 302. In another example, the data exploration application 306 includes a machine learning algorithm module (not shown) to train a machine learning model based on the (encrypted synthesized) data received from the cloud application 124.

The user 126 formulates the data request (e.g., what type of data, the scope of the data, etc) that he/she wishes to access/operate on using the data request application 304. The data request application 304 generates the data request and the permission request. The cloud application interface 302 communicates the data request and the permission request to the owner of the data (e.g., user 136) via the cloud application 124. The cloud application interface 302 receives an approval document and the encrypted synthesized dataset from the cloud application 124. The data request application 304 stores the approval document 314 in the storage device 140. The user 126 uses the data exploration application 306 to view or generate a model based on the encrypted synthesized dataset.

In one example, the data exploration application 306 includes a data query module 308, a data decrypter module 310, and a data visualization module 316. The data query module 308 enables the user to query/view data from the encrypted synthesized dataset. The data decrypter module 310 decrypts the encrypted synthesized dataset. The data visualization module 316 generates a visual representation of the decrypted synthesized dataset. The storage device 140 stores datasets 312 (e.g., encrypted synthesized dataset).

Figure 4:
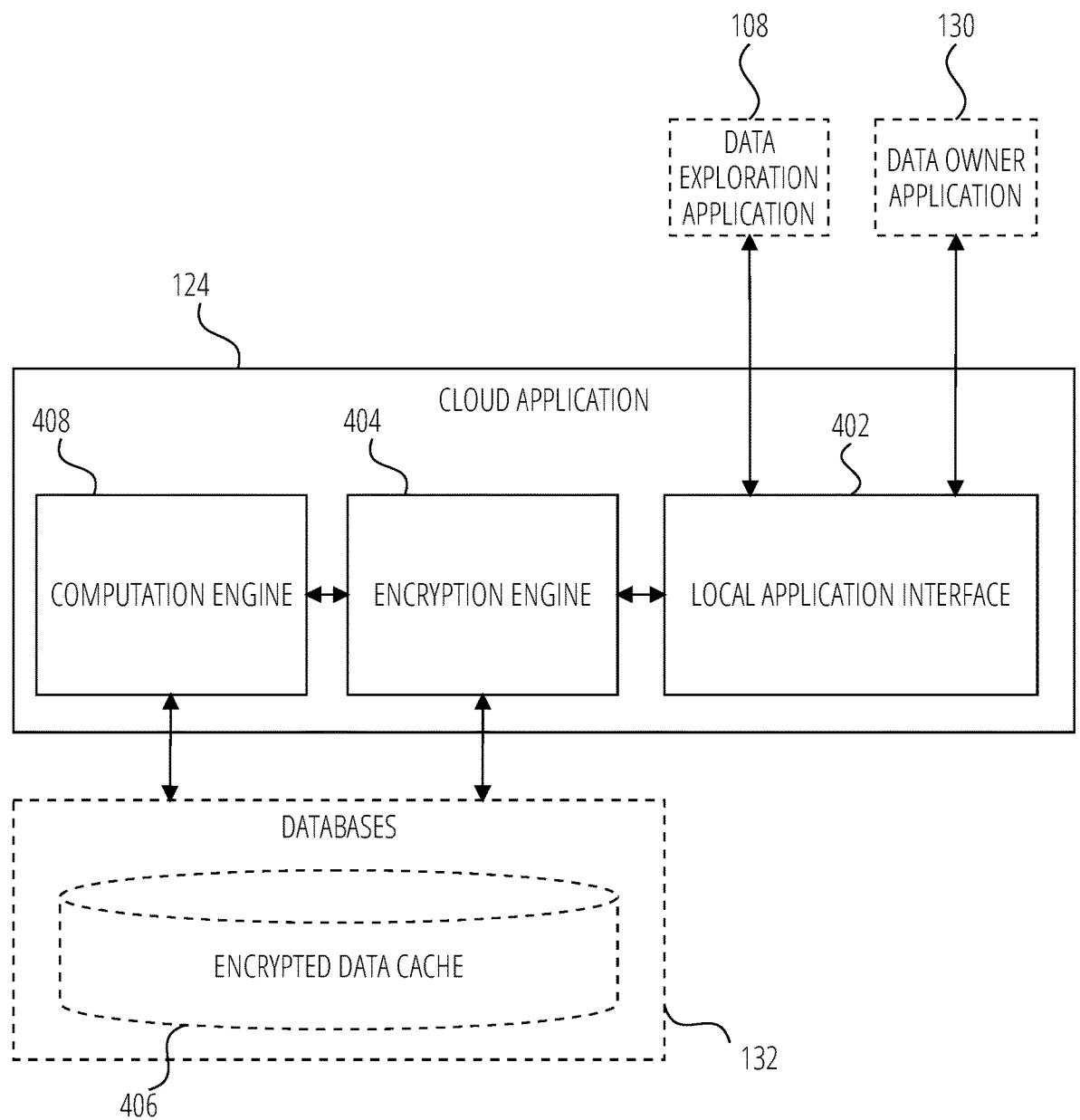
FIG. 4 is a block diagram illustrating a cloud application in accordance with one example embodiment.

FIG. 4 illustrates a block diagram of the cloud application 124 resident on the application server 116 according to one embodiment. The cloud application 124 facilitates communication between the data owner and data scientist client devices and enables server-side computation on encrypted data.

The cloud application 124 includes a local application interface 402, an encryption engine 404, a computation engine 408, and an encrypted data cache 406.

The local application interface 402 communicates with the data exploration application 108 on the first client device 106 operated by the data scientist and the data owner application 130 on the second client device 128 operated by the data owner.

The encryption engine 404 encrypts communications and data transferred between the application server 116 and the client devices 106, 128. This protects the data in transit.

The computation engine 408 performs algebraic and other computations on encrypted synthesized datasets provided by the data owner application 130. For example, the computation engine 408 may apply machine learning algorithms for training models.

The encrypted data cache 406 stores encrypted datasets and computation results to enable efficient access. Caching avoids redundant computations.

In this manner, the cloud application 124 acts as an intermediary between data owners and data scientists, facilitating the exchange of encrypted data and the server-side execution of computations over encrypted data. The local application interface 402, encryption engine 404, computation engine 408, and encrypted data cache 406 collectively enable these cloud-based services.

Figure 5:
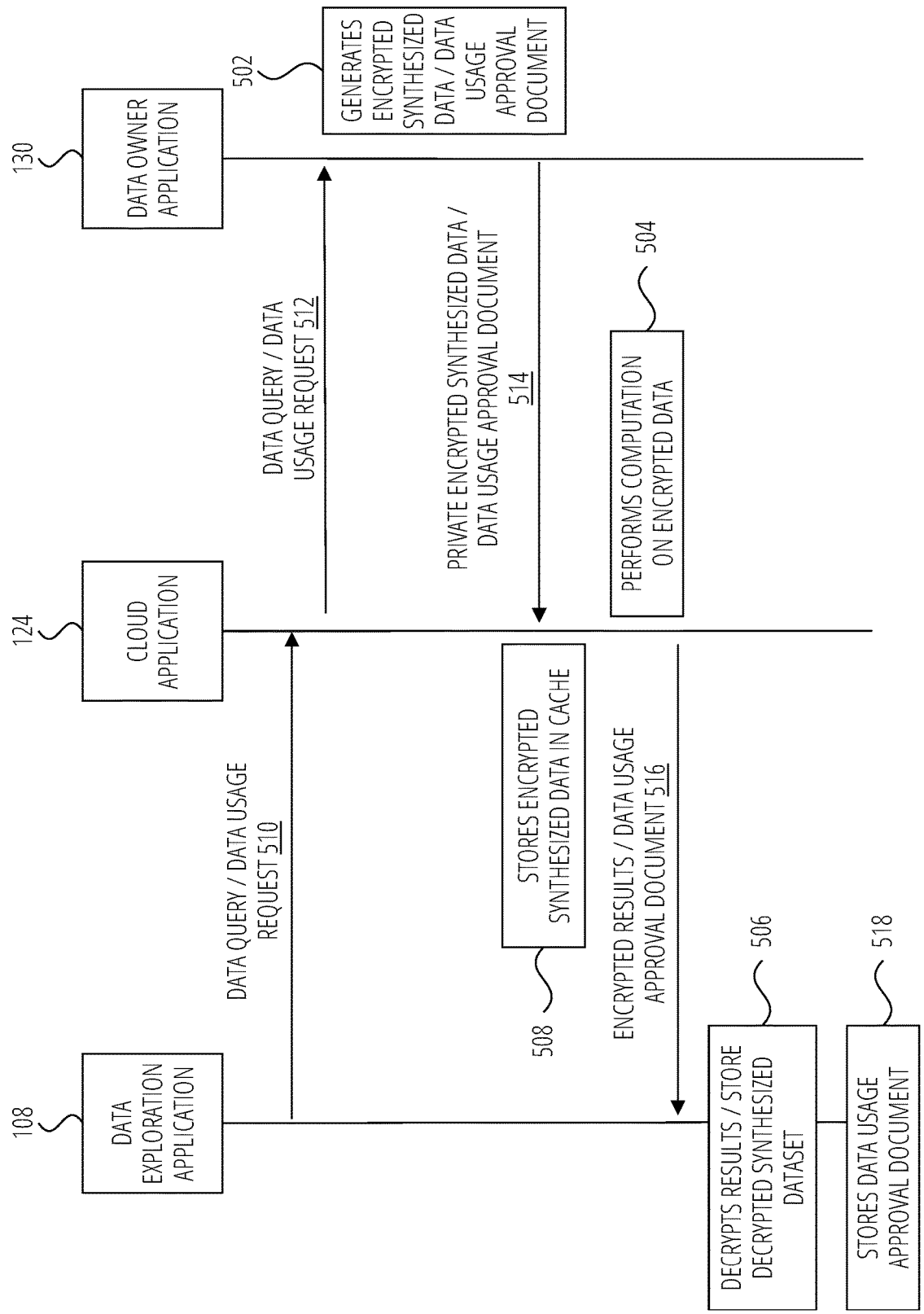
FIG. 5 is an interaction diagram illustrating a method in accordance with one example embodiment.

FIG. 5 illustrates an interaction diagram of a method for providing private and secure data exploration according to one embodiment. As depicted, the data exploration application 108 resident on a first client device transmits a data query and data usage request 510 to the cloud application 124 resident on a server.

The cloud application 124 then relays the data query and data usage request 512 to the data owner application 130 resident on a second client device. In response, the data owner application 130 generates an encrypted and synthesized version of the requested data 502. Additionally, the data owner application 130 generates a corresponding data usage approval document.

The data owner application 130 transmits the private encrypted synthesized data and data usage approval document 514 back to the cloud application 124. The cloud application 124 stores the encrypted synthesized data in cache 508. In one embodiment, the cloud application 124 further performs computations on the encrypted synthesized data 504, such as fitting a machine learning model.

The cloud application 124 then transmits the homomorphically encrypted results of the computation and the data usage approval document 516 to the data exploration application 108. The data exploration application 108 decrypts the results and stores the decrypted synthesized dataset 506. Additionally, the data exploration application 108 stores the received data usage approval document 518.

In this manner, FIG. 5 illustrates the interaction between the client-side data exploration application, cloud-based application, and client-side data owner application to enable private and secure data exploration according to the various embodiments described.

Figure 6:
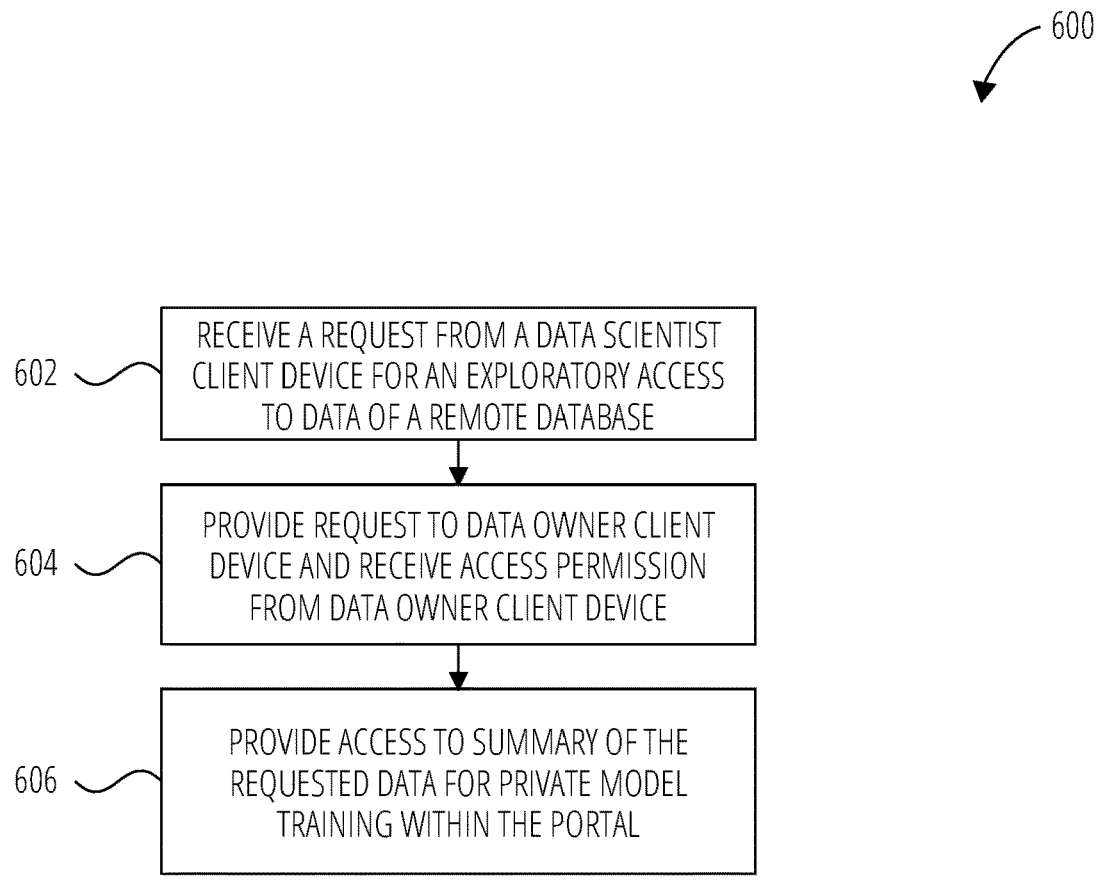
FIG. 6 is a flow diagram illustrating a method for providing access to data in accordance with one example embodiment.

FIG. 6 illustrates a flowchart of a method for providing exploratory data access according to one embodiment. As shown, the method 600 begins at block 602, where the cloud application 124 resident on an application server 104 receives a request from a first client device 106 operated by a data scientist for exploratory access to data contained in a database 138 associated with a second client device 128.

At block 604, the cloud application 124 transmits the request to the second client device 128 operated by a data owner and subsequently receives an access permission response from the data owner application 130 resident on the second client device 128.

Upon receiving access permission, at block 606 the cloud application 124 provides access to a summary of the requested data to the first client device 106. In one embodiment, the summary includes differentially private aggregated statistics computed on the requested data to enable preliminary data exploration and analysis within the secure portal environment, while preserving individual privacy.

In this manner, the method 600 enables a configurable exploratory data access workflow between the data scientist client device, data owner client device, and cloud application. The cloud application brokerage allows controlled data exploration without requiring explicit data permissions for each request.

Additional embodiments may further allow exploration through remote fitting of machine learning models within the secure portal. The data owner application may also automatically configure access permissions based on data scientist credentials, request types, and predefined access rules.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
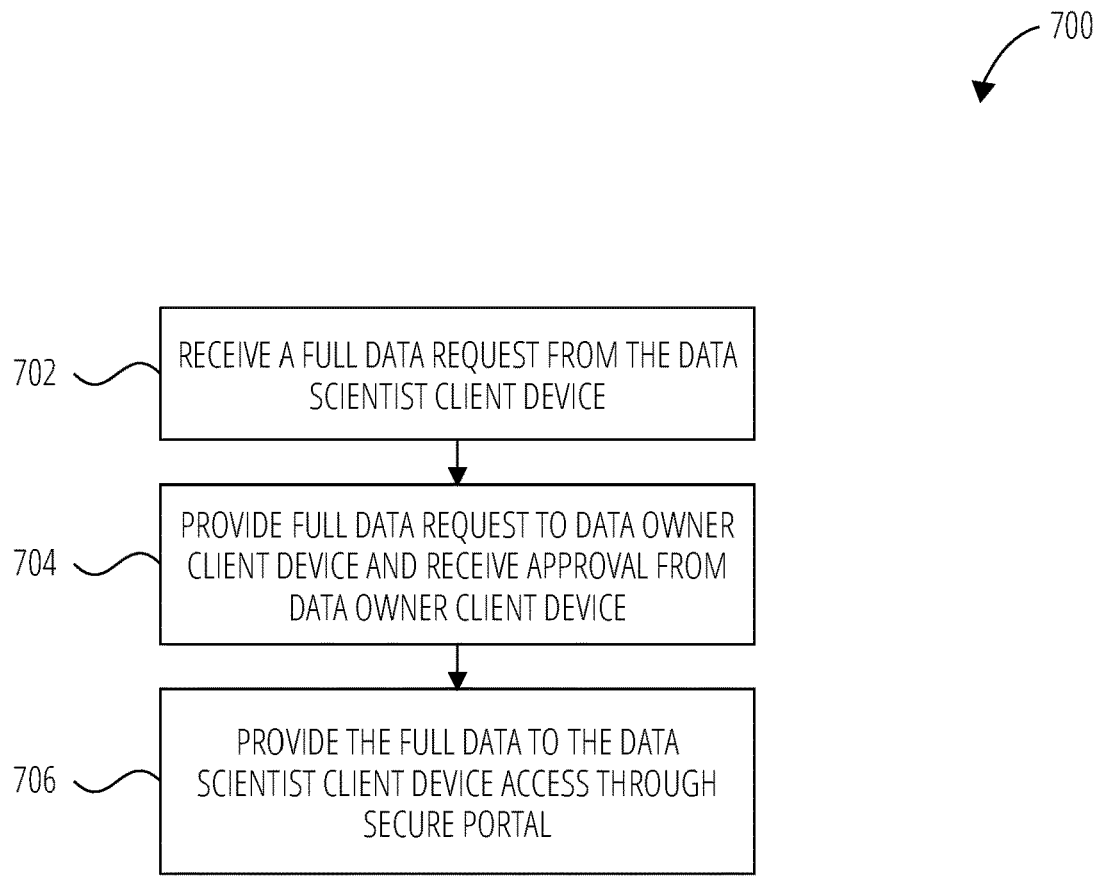
FIG. 7 is a flow diagram illustrating a method for providing access to data in accordance with one example embodiment.

FIG. 7 illustrates a flowchart of a method for providing access to original data according to one embodiment. As shown, the method 700 begins at block 702, where the cloud application 124 resident on an application server 104 receives a request for full access to original data contained in a database 138 associated with a second client device 128.

At block 704, the cloud application 124 transmits the request to the second client device 128 operated by a data owner and subsequently receives an approval response from the data owner application 130 resident on the second client device 128.

Upon receiving approval, at block 706 the cloud application 124 enables the first client device 106 operated by the requesting data scientist to securely access the original data through the private portal environment.

In one embodiment, the cloud application 124 may automatically generate required data release forms and permissions based on the request, with the data owner application 130 providing final authorization. Secure transmission protocols are utilized to retrieve and transmit the original data.

In this manner, the method 700 provides a streamlined and controlled mechanism of releasing original data following preliminary exploration and analysis enabled by the embodiments described previously. The cloud application 124 acts as a broker and enforcer for the data access based on data owner-configured permissions.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
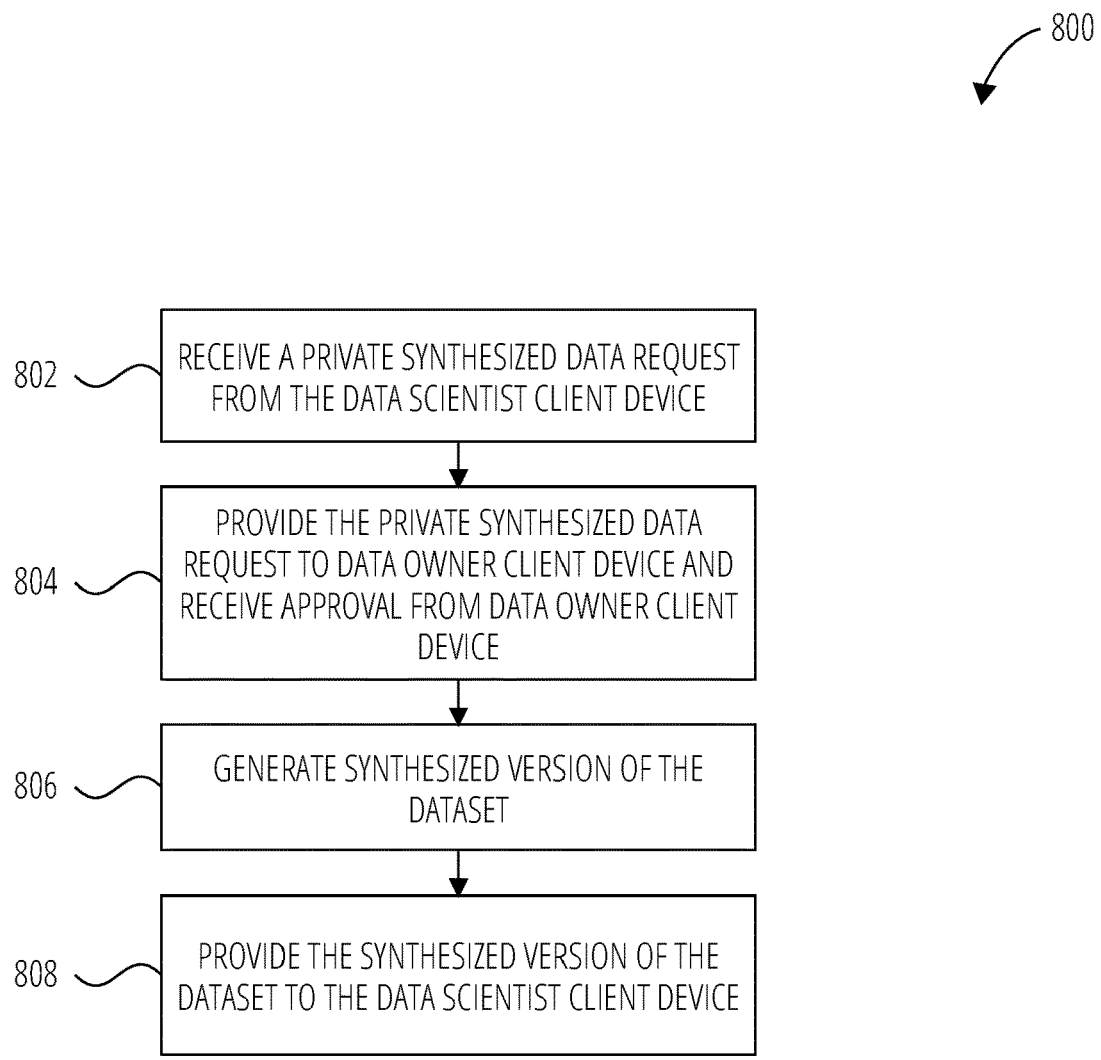
FIG. 8 is a flow diagram illustrating a method for providing access to a synthesized version of requested data in accordance with one example embodiment.

FIG. 8 illustrates a flowchart of a method for providing access to a synthesized dataset according to one embodiment. As shown, the method 800 begins at block 802, where the cloud application 124 resident on an application server 104 receives a request from a first client device 106 operated by a data scientist for a synthesized version of a dataset contained in a database 138 associated with a second client device 128.

At block 804, the cloud application 124 transmits the synthesized data request to the second client device 128 operated by a data owner and subsequently receives an approval response from the data owner application 130 resident on the second client device 128.

Upon receiving approval, at block 806, the data owner application 130 generates a synthesized version of the requested dataset by applying differential privacy and/or homomorphic encryption techniques. This creates an altered dataset that preserves the statistical properties of the original data without disclosing actual sensitive values.

At block 808, the synthesized dataset is transmitted to the first client device 106 via the cloud application 124. This allows the data scientist to perform further analysis and modeling using the synthesized data outside the secure portal environment.

In this manner, the method 800 provides a technique for releasing a privacy-preserving synthesized version of sensitive data that does not require sharing the original raw data. The data owner retains control over the synthesis process to enforce desired privacy guarantees. The cloud application 124 enables transfer of the synthesized data.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
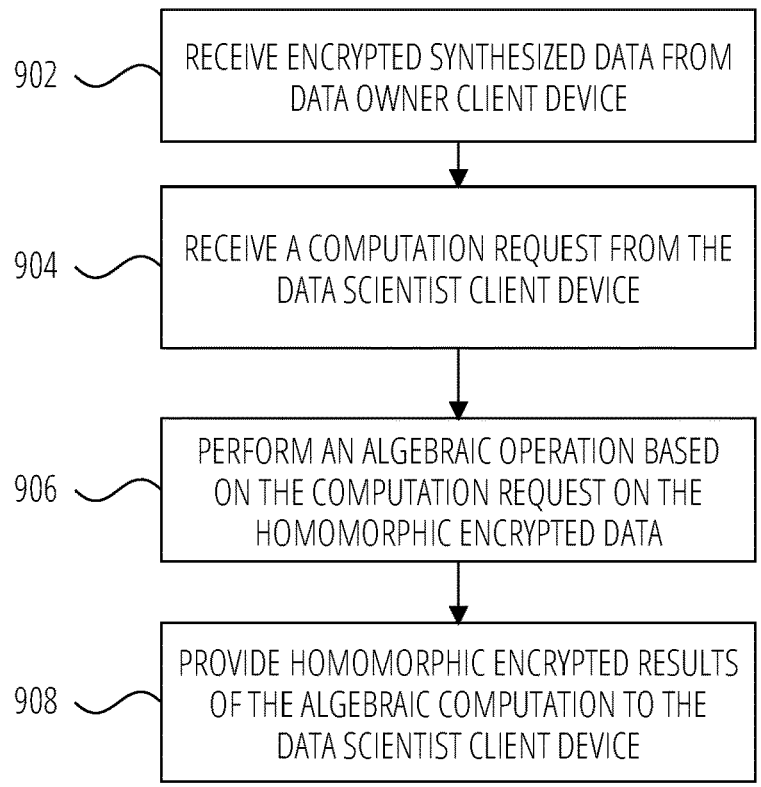
FIG. 9 is a flow diagram illustrating a method for providing homomorphic encrypted data in accordance with one example embodiment.

FIG. 9 illustrates a flowchart of a method for providing access to homomorphically encrypted computation results according to one embodiment. As shown, the method 900 begins at block 902, where the cloud application 124 receives an encrypted synthesized dataset from the data owner application 130 resident on a second client device 128.

At block 904, the cloud application 124 receives a computation request from a first client device 106 operated by a data scientist. This may include requests for statistical analysis, model fitting, predictions, or other algebraic operations.

At block 906, the cloud application 124 performs the requested computation on the homomorphically encrypted synthesized dataset. This allows computations to be carried out without decrypting the underlying data.

At block 908, the cloud application 124 transmits the homomorphically encrypted results of the computation to the first client device 106. The data scientist can then decrypt the results to obtain plain text outputs.

In this manner, the method 900 leverages homomorphic encryption properties to enable server-side computation on sensitive data sets without exposing decrypted data. The data owner provides encrypted synthesized data, and the data scientist receives encrypted computation outputs, preserving confidentiality.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 10:
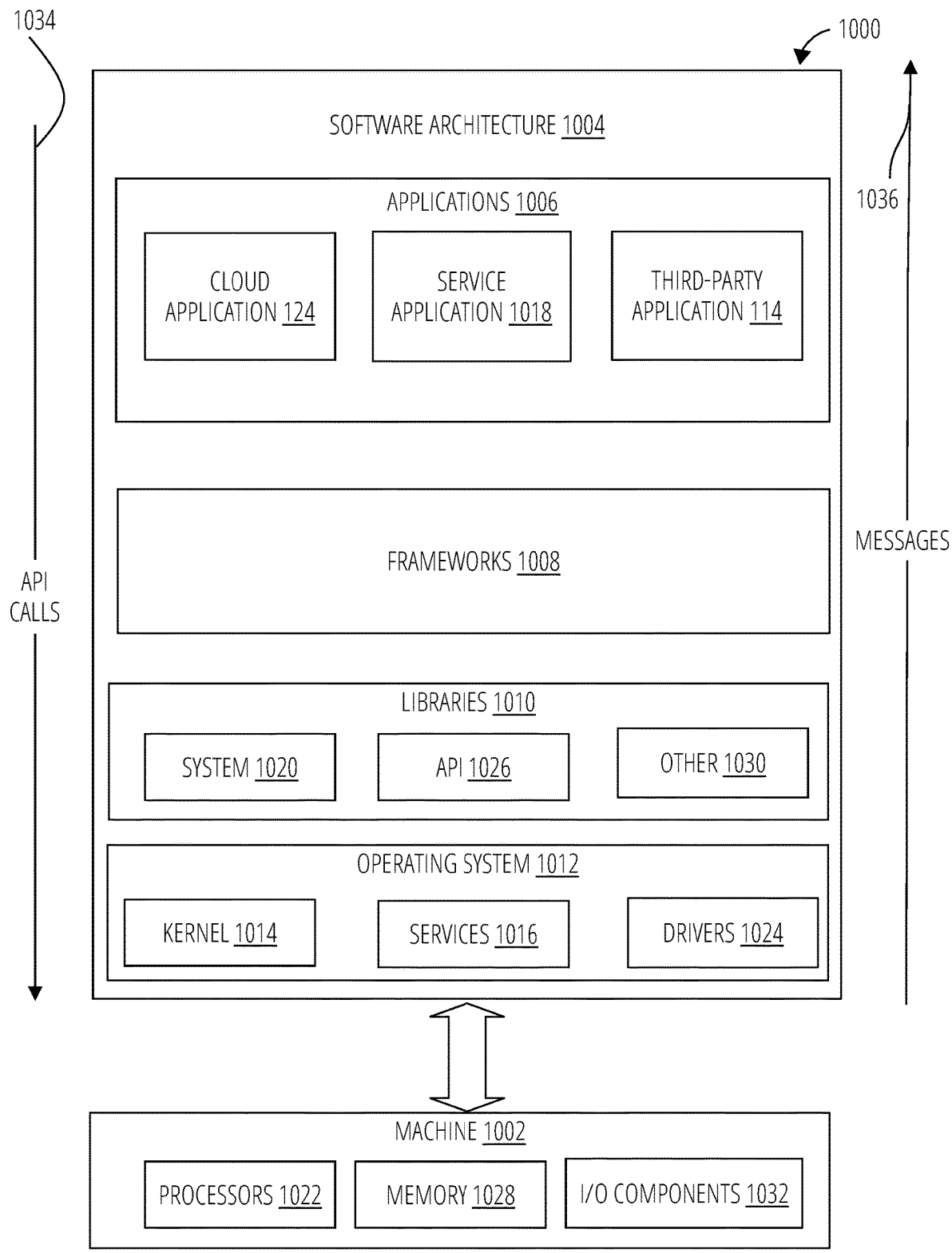
FIG. 10 is block diagram showing a software architecture within which the present disclosure may be implemented, according to an example embodiment.

FIG. 10 is a block diagram 1000 illustrating a software architecture 1004, which can be installed on any one or more of the devices described herein. The software architecture 1004 is supported by hardware such as a machine 1002 that includes processors 1022, memory 1028, and I/O components 1032. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1034 through the software stack and receive messages 1036 in response to the API calls 1034.

The operating system 1012 manages hardware resources and provides common services. The operating system 1012 includes, for example, a kernel 1014, services 1016, and drivers 1024. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1024 are responsible for controlling or interfacing with the underlying hardware. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1020 (e.g., C standard library) that provide functions such as memory allocation functions, string manipulation functions, mathematic functions, and the like. In addition, the libraries 1010 can include API libraries 1026 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1030 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a cloud application 124, A service application 1018, and a broad assortment of other applications such as a third-party application 114. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 114 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 114 can invoke the API calls 1034 provided by the operating system 1012 to facilitate functionality described herein.

Figure 11:
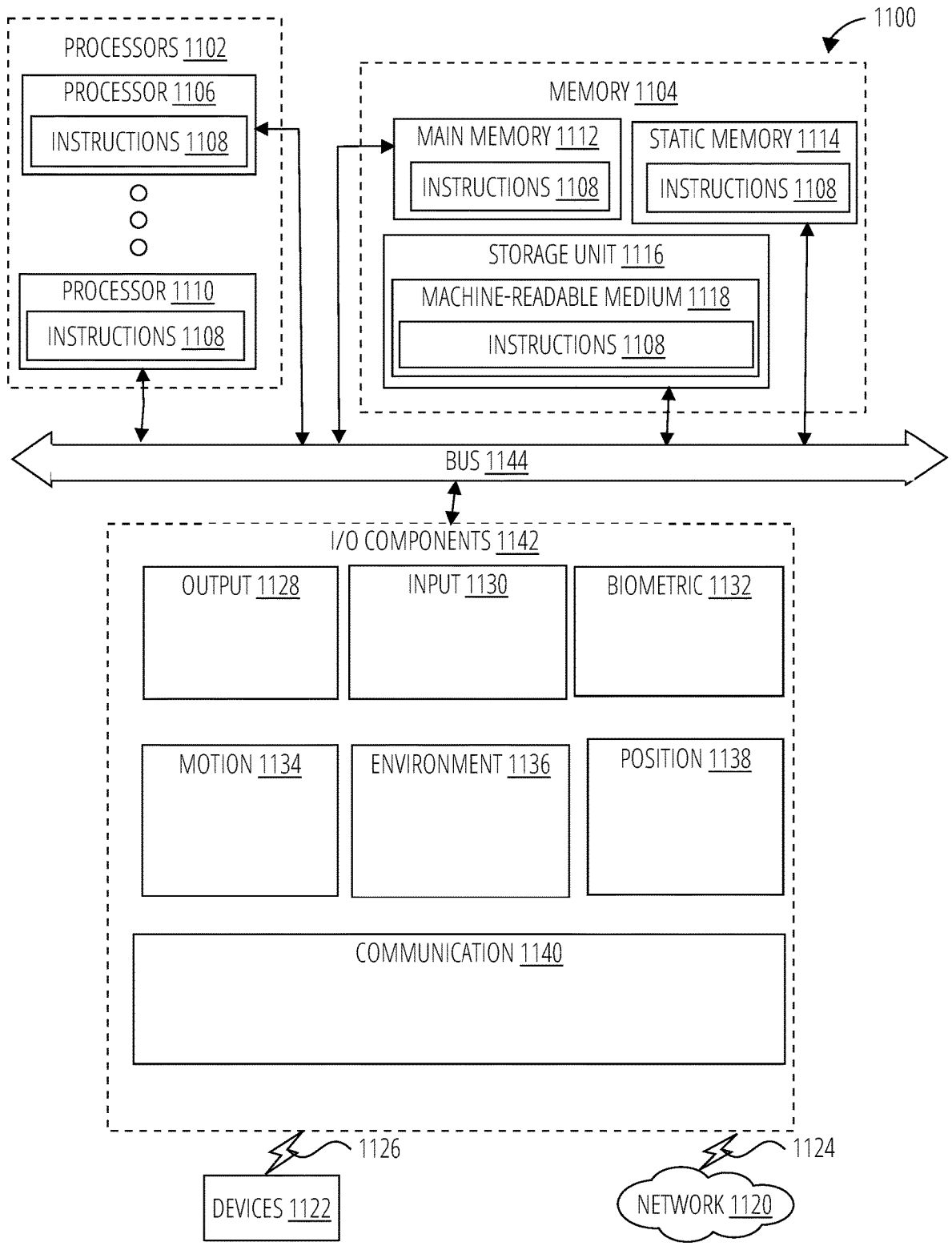
FIG. 11 is a diagrammatic representation of a machine in the form of a computer system within which a set of instructions may be executed for causing the machine to perform any one or more of the methodologies discussed herein, according to an example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1142, which may be configured to communicate with each other via a bus 1144. In an example embodiment, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones may include a touch input device or other such input mechanisms, while a headless server machine will likely not include such a touch input device. It will be appreciated that the I/O components 1142 may include many other components that are not shown in FIG. 11. In various example embodiments, the I/O components 1142 may include output components 1128 and input components 1130. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1142 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 further include communication components 1140 operable to couple the machine 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface component included in the communication components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Example 1 is a computer-implemented method comprising: receiving, from a first client device, a permission request and a data request for a first dataset that is stored at a second client device; providing the permission request and the data request to the second client device, the second client device configured to generate, in response to the permission request and the data request, a data usage approval document and an encrypted synthesized dataset corresponding to the data usage approval document, the encrypted synthesized dataset comprising a synthetic second dataset representative of the first dataset; receiving, from the second client device, the data usage approval document and the encrypted synthesized dataset; performing, at a server, a computation on the encrypted synthesized dataset based on the data request; and providing the data usage approval document and results of the computation to the first client device.

In Example 2, the subject matter of Example 1 includes, wherein the second client device is configured to apply a homomorphic encryption algorithm to the first dataset to generate a homomorphic encrypted version of the first dataset, wherein the second client device is configured to apply a differential privacy algorithm to the first dataset to generate a differential privacy version of the first dataset, wherein the synthetic second dataset includes the homomorphic encrypted version of the first dataset and the differential privacy version of the first dataset.

In Example 3, the subject matter of Examples 1-2 includes, wherein the second client device is configured to apply a homomorphic encryption algorithm to the first dataset to generate a homomorphic encrypted version of the first dataset, wherein the second client device is configured to apply a differential privacy algorithm to the homomorphic encrypted version of the first dataset to generate the encrypted synthesized dataset.

In Example 4, the subject matter of Examples 1-3 includes, wherein the second client device is configured to apply a differential privacy algorithm to the first dataset to generate a differential privacy version of the first dataset, wherein the second client device is configured to apply a homomorphic encryption algorithm to the differential privacy version of the first dataset to generate the encrypted synthesized dataset.

In Example 5, the subject matter of Examples 1-4 includes, providing the encrypted synthesized dataset to the first client device, the first client device configured to decrypt the encrypted synthesized dataset, to store a decrypted synthesized dataset and the data usage approval document in a storage device of the first client device.

In Example 6, the subject matter of Examples 1-5 includes, wherein the first client device is configured to apply a machine learning algorithm to generate a machine learning model based on the encrypted synthesized dataset.

In Example 7, the subject matter of Examples 1-6 includes, generating a secured and private data portal API, and wherein the permission request and the data request are received from the first client device via the secured and private data portal API, wherein the data usage approval document and the encrypted synthesized dataset are received from the second client device via the secured and private data portal API.

In Example 8, the subject matter of Examples 1-7 includes, wherein the data request includes a request to access or to operate on the first dataset.

In Example 9, the subject matter of Examples 1-8 includes, wherein the data usage approval document is based on the permission request, the data request, and a set of pre-defined conditions for the first dataset by the second client device.

In Example 10, the subject matter of Examples 1-9 includes, updating, at the server, the permission request based on the data request.

Example 11 is a computing apparatus comprising: a Processor; and a memory storing instructions that, when executed by the Processor, configure the apparatus to: receive, from a first client device, a permission request and a data request for a first dataset that is stored at a second client device; provide the permission request and the data request to the second client device, the second client device configured to generate, in response to the permission request and the data request, a data usage approval document and an encrypted synthesized dataset corresponding to the data usage approval document, the encrypted synthesized dataset comprising a synthetic second dataset representative of the first dataset; receive, from the second client device, the data usage approval document and the encrypted synthesized dataset; perform, at a server, a computation on the encrypted synthesized dataset based on the data request; and provide the data usage approval document and results of the computation to the first client device.

In Example 12, the subject matter of Example 11 includes, wherein the second client device is configured to apply a homomorphic encryption algorithm to the first dataset to generate a homomorphic encrypted version of the first dataset, wherein the second client device is configured to apply a differential privacy algorithm to the first dataset to generate a differential privacy version of the first dataset, wherein the synthetic second dataset includes the homomorphic encrypted version of the first dataset and the differential privacy version of the first dataset.

In Example 13, the subject matter of Examples 11-12 includes, wherein the second client device is configured to apply a homomorphic encryption algorithm to the first dataset to generate a homomorphic encrypted version of the first dataset, wherein the second client device is configured to apply a differential privacy algorithm to the homomorphic encrypted version of the first dataset to generate the encrypted synthesized dataset.

In Example 14, the subject matter of Examples 11-13 includes, wherein the second client device is configured to apply a differential privacy algorithm to the first dataset to generate a differential privacy version of the first dataset, wherein the second client device is configured to apply a homomorphic encryption algorithm to the differential privacy version of the first dataset to generate the encrypted synthesized dataset.

In Example 15, the subject matter of Examples 11-14 includes, wherein the instructions further configure the apparatus to: provide the encrypted synthesized dataset to the first client device, the first client device configured to decrypt the encrypted synthesized dataset, to store a decrypted synthesized dataset and the data usage approval document in a storage device of the first client device.

In Example 16, the subject matter of Examples 11-15 includes, wherein the first client device is configured to apply a machine learn algorithm to generate a machine learning model based on the encrypted synthesized dataset.

In Example 17, the subject matter of Examples 11-16 includes, wherein the instructions further configure the apparatus to: generate a secured and private data portal API, and wherein the permission request and the data request are received from the first client device via the secured and private data portal API, wherein the data usage approval document and the encrypted synthesized dataset are received from the second client device via the secured and private data portal API.

In Example 18, the subject matter of Examples 11-17 includes, wherein the data request includes a request to access or to operate on the first dataset.

In Example 19, the subject matter of Examples 11-18 includes, wherein the data usage approval document is based on the permission request, the data request, and a set of pre-defined conditions for the first dataset by the second client device.

Example 20 is a non-transitory computer-readable storage medium, the computer-readable storage medium including instructions that when executed by a computer, cause the computer to: receive, from a first client device, a permission request and a data request for a first dataset that is stored at a second client device; provide the permission request and the data request to the second client device, the second client device configured to generate, in response to the permission request and the data request, a data usage approval document and an encrypted synthesized dataset corresponding to the data usage approval document, the encrypted synthesized dataset comprising a synthetic second dataset representative of the first dataset; receive, from the second client device, the data usage approval document and the encrypted synthesized dataset; perform, at a server, a computation on the encrypted synthesized dataset based on the data request; and provide the data usage approval document and results of the computation to the first client device.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A computer-implemented method comprising:
receiving, from a first client device, a permission request and a data request for a first dataset that is stored at a second client device;
providing the permission request and the data request to the second client device, the second client device configured to generate, in response to the permission request and the data request, a data usage approval document and an encrypted synthesized dataset, wherein the second client device is configured to:
generate a synthetic second dataset by applying a differential privacy algorithm to the first dataset, such that the synthetic second dataset does not contain any individual record or original data from the first dataset;
apply a homomorphic encryption algorithm to the synthetic second dataset to generate the encrypted synthesized dataset; and
wherein the first dataset remains stored at the second client device and is not transmitted to any other device;
receiving, from the second client device, the data usage approval document and the encrypted synthesized dataset;
performing, at a server, a computation on the encrypted synthesized dataset based on the data request, wherein the computation is performed on the homomorphically encrypted, differentially private synthetic second dataset without decrypting the encrypted synthesized dataset at the server; and
providing the data usage approval document and results of the computation to the first client device.

2. The computer-implemented method of claim 1, wherein the second client device is configured to apply a homomorphic encryption algorithm to the first dataset to generate a homomorphic encrypted version of the first dataset,
wherein the second client device is configured to apply a differential privacy algorithm to the first dataset to generate a differential privacy version of the first dataset,
wherein the synthetic second dataset includes the homomorphic encrypted version of the first dataset and the differential privacy version of the first dataset.

3. The computer-implemented method of claim 1, wherein the second client device is configured to apply a homomorphic encryption algorithm to the first dataset to generate a homomorphic encrypted version of the first dataset,
wherein the second client device is configured to apply a differential privacy algorithm to the homomorphic encrypted version of the first dataset to generate the encrypted synthesized dataset.

4. The computer-implemented method of claim 1, wherein the second client device is configured to apply a differential privacy algorithm to the first dataset to generate a differential privacy version of the first dataset,
wherein the second client device is configured to apply a homomorphic encryption algorithm to the differential privacy version of the first dataset to generate the encrypted synthesized dataset.

5. The computer-implemented method of claim 1, further comprising:
providing the encrypted synthesized dataset to the first client device, the first client device configured to decrypt the encrypted synthesized dataset, to store a decrypted synthesized dataset and the data usage approval document in a storage device of the first client device.

6. The computer-implemented method of claim 1, wherein the first client device is configured to apply a machine learning algorithm to generate a machine learning model based on the encrypted synthesized dataset.

7. The computer-implemented method of claim 1, further comprising:
generating a secured and private data portal API, and
wherein the permission request and the data request are received from the first client device via the secured and private data portal API,
wherein the data usage approval document and the encrypted synthesized dataset are received from the second client device via the secured and private data portal API.

8. The computer-implemented method of claim 1, wherein the data request includes a request to access or to operate on the first dataset.

9. The computer-implemented method of claim 1, wherein the data usage approval document is based on the permission request, the data request, and a set of pre-defined conditions for the first dataset by the second client device.

10. The computer-implemented method of claim 1, further comprising:
updating, at the server, the permission request based on the data request.

11. A computing apparatus comprising:
a processor; and
a memory storing instructions that, when executed by the processor, configure the apparatus to:
receive, from a first client device, a permission request and a data request for a first dataset that is stored at a second client device;
provide the permission request and the data request to the second client device, the second client device configured to generate, in response to the permission request and the data request, a data usage approval document and an encrypted synthesized dataset, wherein the second client device is configured to:
generate a synthetic second dataset by applying a differential privacy algorithm to the first dataset, such that the synthetic second dataset does not contain any individual record or original data from the first dataset;
apply a homomorphic encryption algorithm to the synthetic second dataset to generate the encrypted synthesized dataset; and
wherein the first dataset remains stored at the second client device and is not transmitted to any other device;
receive, from the second client device, the data usage approval document and the encrypted synthesized dataset;
perform, at a server, a computation on the encrypted synthesized dataset based on the data request, wherein the computation is performed on the homomorphically encrypted, differentially private synthetic second dataset without decrypting the encrypted synthesized dataset at the server; and
provide the data usage approval document and results of the computation to the first client device.

12. The computing apparatus of claim 11, wherein the second client device is configured to apply a homomorphic encryption algorithm to the first dataset to generate a homomorphic encrypted version of the first dataset,
wherein the second client device is configured to apply a differential privacy algorithm to the first dataset to generate a differential privacy version of the first dataset,
wherein the synthetic second dataset includes the homomorphic encrypted version of the first dataset and the differential privacy version of the first dataset.

13. The computing apparatus of claim 11, wherein the second client device is configured to apply a homomorphic encryption algorithm to the first dataset to generate a homomorphic encrypted version of the first dataset,
wherein the second client device is configured to apply a differential privacy algorithm to the homomorphic encrypted version of the first dataset to generate the encrypted synthesized dataset.

14. The computing apparatus of claim 11, wherein the second client device is configured to apply a differential privacy algorithm to the first dataset to generate a differential privacy version of the first dataset,
wherein the second client device is configured to apply a homomorphic encryption algorithm to the differential privacy version of the first dataset to generate the encrypted synthesized dataset.

15. The computing apparatus of claim 11, wherein the instructions further configure the apparatus to:
provide the encrypted synthesized dataset to the first client device, the first client device configured to decrypt the encrypted synthesized dataset, to store a decrypted synthesized dataset and the data usage approval document in a storage device of the first client device.

16. The computing apparatus of claim 11, wherein the first client device is configured to apply a machine learn algorithm to generate a machine learning model based on the encrypted synthesized dataset.

17. The computing apparatus of claim 11, wherein the instructions further configure the apparatus to:
generate a secured and private data portal API, and
wherein the permission request and the data request are received from the first client device via the secured and private data portal API,
wherein the data usage approval document and the encrypted synthesized dataset are received from the second client device via the secured and private data portal API.

18. The computing apparatus of claim 11, wherein the data request includes a request to access or to operate on the first dataset.

19. The computing apparatus of claim 11, wherein the data usage approval document is based on the permission request, the data request, and a set of pre-defined conditions for the first dataset by the second client device.

20. A non-transitory computer-readable storage medium, the computer-readable storage medium including instructions that when executed by a computer, cause the computer to:
receive, from a first client device, a permission request and a data request for a first dataset that is stored at a second client device;
provide the permission request and the data request to the second client device, the second client device configured to generate, in response to the permission request and the data request, a data usage approval document and an encrypted synthesized dataset, wherein the second client device is configured to:
  generate a synthetic second dataset by applying a differential privacy algorithm to the first dataset, such that the synthetic second dataset does not contain any individual record or original data from the first dataset;
  apply a homomorphic encryption algorithm to the synthetic second dataset to generate the encrypted synthesized dataset; and
  wherein the first dataset remains stored at the second client device and is not transmitted to any other device;
receive, from the second client device, the data usage approval document and the encrypted synthesized dataset;
perform, at a server, a computation on the encrypted synthesized dataset based on the data request, wherein the computation is performed on the homomorphically encrypted, differentially private synthetic second dataset without decrypting the encrypted synthesized dataset at the server; and
provide the data usage approval document and results of the computation to the first client device.

* * * * *